(12) United States Patent
Yamamoto (10) Patent No.: US 6,335,731 B1
(45) Date of Patent: Jan. 1, 2002

(54) IMAGE GENERATION DEVICE AND INFORMATION STORAGE MEDIUM

(75) Inventor: Takeyasu Yamamoto, Tokyo (JP)

(73) Assignee: Namco, Ltd., Tokyo (JP)

( * ) Notice: Subject to any disclaimer, the term of this patent is extended or adjusted under 35 U.S.C. 154(b) by 0 days.

(21) Appl. No.: 09/261,166

(22) Filed: Mar. 3, 1999

(30) Foreign Application Priority Data

Mar. 5, 1998 (JP) ............................................ 10-073416

(51) Int. Cl.[7] .............................................. G06T 17/00
(52) U.S. Cl. ........................ 345/420; 382/285; 345/419
(58) Field of Search ................................ 345/420, 419, 345/421, 425; 382/285

(56) References Cited

U.S. PATENT DOCUMENTS

| | | | |
|---|---|---|---|
| 4,710,873 A | 12/1987 | Breslow et al. | 364/410 |
| 5,553,864 A | 9/1996 | Sitrick | 463/31 |
| 5,561,746 A | * 10/1996 | Murata et al. | 345/419 |
| 5,606,374 A | * 2/1997 | Bertram | 348/565 |
| 5,748,192 A | * 5/1998 | Lindholm | 345/425 |
| 6,021,229 A | * 2/2000 | Takashima et al. | 382/285 |

FOREIGN PATENT DOCUMENTS

| | | |
|---|---|---|
| JP | A-6-165874 | 6/1994 |
| JP | A-6-165879 | 6/1994 |
| JP | A-6-176131 | 6/1994 |
| JP | A-6-195437 | 7/1994 |
| JP | A-7-8632 | 1/1995 |
| JP | A-8-63614 | 3/1996 |
| JP | A-9-140936 | 6/1997 |
| JP | A-9-140940 | 6/1997 |
| WO | WO 95/09405 | 4/1995 |

* cited by examiner

Primary Examiner—Cliff N. Vo
Assistant Examiner—Huedung X. Cao
(74) Attorney, Agent, or Firm—Oliff & Berridge, PLC (57) ABSTRACT

An image photographed by a CCD camera is captured, and this captured image is mapped onto a marker object. The perspective of the captured image is modified in accordance with whether the marker object is far away or near. When the marker object is far away, the perspective is modified to give the impression that it is nearer to the viewer than its actual position. The perspective is modified by varying the scaling factor S of the marker object. When the marker object is behind an obscuring object, an image is generated to make it appear as if the marker object is in front of the marker object. The marker object can be made to appear as if in front of the obscuring object, by increasing the priority that is assigned to the marker object for hidden-surface removal.

32 Claims, 11 Drawing Sheets

IMAGE GENERATION DEVICE AND INFORMATION STORAGE MEDIUM

BACKGROUND OF THE INVENTION

1. Field of the Invention

The present invention relates to an image generation device and an information storage medium for generating an image as seen from a given viewpoint within an object space.

2. Description of Related Art

An image generation device is known in the art for disposing a plurality of objects within an object space, which is a virtual three-dimensional space, and generating an image as seen from a given viewpoint within that object space, making it highly popular for enabling players to experience a virtual reality. An example of this is an image generation device that enables players to enjoy a racing-car game, where each player manipulates a racing car to cause it to run within the object space and compete against other racing cars manipulated by other players, to enjoy this three-dimensional game.

With such an image generation device, it is desirable that the players can readily identify which player is manipulating which moving body (such as a racing car). Another subject of technical concern is to improve the feeling of a virtual reality that the players experience. One method that could be considered for identifying which player is manipulating which moving body is to display player identification images formed of written labels, superimposed on the moving bodies. For example, a moving body manipulated by a first player could have the written label "1P" attached to it and a moving body manipulated by a second player could have the written label "2P" attached to it. Alternatively, the players' names could be attached to the corresponding moving bodies.

However, it is difficult for the players to immediately identify which players are manipulating which moving bodies. In addition, written labels such as "1P" and "2P" make it impossible for the players to become emotionally involved with the moving bodies, and thus it is not possible to increase the feeling of virtual reality experienced by the players.

It is also preferable that the player can easily and distinctly recognize which player is manipulating which moving body, whatever the current state of the game.

Note that techniques of utilizing photographed face images of the players in a game have already been disclosed in, for example, U.S. Pat. No. 4,710,873, U.S. Pat. No. 5,553,864, Japanese Patent Application Laid-Open No. 6-165874, Japanese Patent Application Laid-Open No. 6-165879, and Japanese Patent Application Laid-Open No. 6-176131. Techniques relating to texture mapping are disclosed in U.S. Pat. No. 5,561,746 and the like. In addition, techniques for making visible a marker that follows a moving body, even if it is hidden from the current field of view, are disclosed in Japanese Patent Application Laid-Open No. 7-8632 and the like.

SUMMARY OF THE INVENTION

The present invention was devised in the light of the above described technical concerns and has an object thereof the provision of an image generation device and information storage medium that simplify the recognition of an object such as a moving body, and also increase the feeling of a virtual reality.

To solve the above described technical concerns, the present invention relates to an image generation device for generating an image at a given viewpoint within an object space, comprising:

means for capturing an image acquired by an image acquisition means;

means for mapping a captured image onto an object;

means for modifying the perspective of the captured image, in accordance with whether the object on which the captured image is mapped is far or near; and means for generating an image at a given viewpoint within an object space.

This aspect of the invention causes the display of an object on which a captured image is mapped. The perspective thereof is modified in accordance with whether the object is far away or near. This makes it possible to simplify the recognition of such an object, even when it ought not to be possible to recognize the captured image because the object is too far away, by way of example.

Note that the determination of whether an object bearing a captured image is far away or near could be based on the distance between the viewpoint position and that object, by way of example.

In a second aspect of the present invention, the perspective is modified in such a manner that, when the object on which the captured image is mapped is far away, the object is made to appear to be nearer than the actual position thereof. This makes it possible to increase the degree of resolution of the captured image, thus making it possible for the player to easily recognize the details of the captured image, even when the object bearing the captured image is far way.

In a third aspect of the present invention, the perspective is modified in such a manner that, when the object on which the captured image is mapped is near, the object is made to appear to be farther away than the actual position thereof. This makes it possible to prevent a captured image from being displayed too big when the object bearing that captured image is near, which would make it difficult for the player to recognize other images.

In a fourth aspect of the present invention, the perspective is modified by varying a scaling factor of the object on which the captured image is mapped. This enables the perspective to be modified by a simple process.

In a fifth aspect of the present invention, when the object on which the captured image is mapped is behind another object, an image of the object is generated as if appearing in front of the other object. Thus, when an object on which a captured image is mapped is hidden by another object such as an obscuring object, the captured image is visible through the obscuring object. As a result, the player can easily recognize the details of captured images, even when the map of the virtual reality has many obscuring objects.

In a sixth aspect of the present invention, an image of the object is generated as if appearing in front of the other object, by increasing a priority assigned for hidden-surface removal to the object on which the captured image is mapped. In other words, the ordinary method of hidden-surface removal would not display an object bearing a captured image when that object is behind an obscuring object. However, by increasing the priority for hidden-surface removal, that object can be made to appear as if in front of the obscuring object, enabling the player to recognize the details of the captured image.

In a seventh aspect of the present invention, the object on which the captured image is mapped is any one of a moving body that is moving within an object space and an object that follows the moving body: and the captured image is an identification image for identifying a player who is manipulating that moving body. This makes it possible to utilize a captured image as an image for identifying a player who is manipulated a moving body, so that all the players can easily and distinctly recognize which player is manipulating which moving body.

DESCRIPTION OF PREFERRED EMBODIMENTS

Preferred embodiment of the present invention are described below with reference to the accompanying figures. Note that the present invention is described as being applied to a combat type of machine-gun game, but it should be obvious that the present invention is not limited to such an application.

Figure 1:
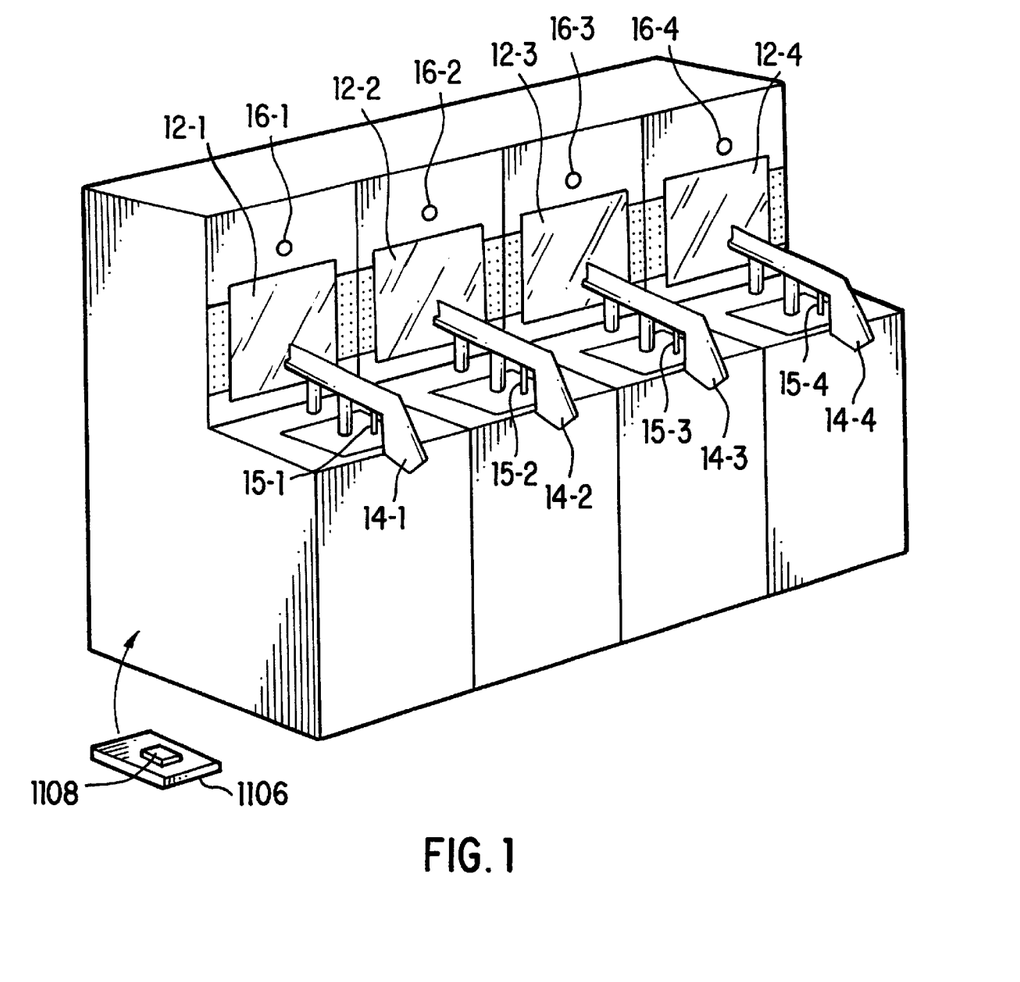
FIG. 1 shows an external view of an example of the image generation device in accordance with an embodiment of the present invention.

An external view of a typical arcade game device incorporating the image generation device of the present embodiment of the invention is shown in FIG. 1.

As shown in FIG. 1, the present embodiment is provided with simulated machine guns 14-1 to 14-4 to correspond to each player, with the configuration being such that up to four players can enjoy this game. Images such as those of a self character (i.e., a virtual player which is one of the characters manipulated by the players themselves), enemy characters, partner characters, a map, and background are displayed on each of display sections 12-1 to 12-4. Each player moves one of the machine guns 14-1 to 14-4 from side to side and backward and forward, to move the corresponding self character around in an object space. When one of the machine guns 14-1 to 14-4 is rotated, the corresponding target object moves to the left or right within the object space. The players pull on triggers 15-1 to 15-4 that are provided on the machine guns 14-1 to 14-4, the fire simulated bullets and thus enjoy a gun battle with enemy characters.

In this case, the present embodiment is configured in such a manner that images such as the faces of the players can be acquired by image acquisition sections 16-1 to 16-4 consisting of devices such as CCD cameras. The thus-acquired images are used as identification image for the players.

Figure 2:
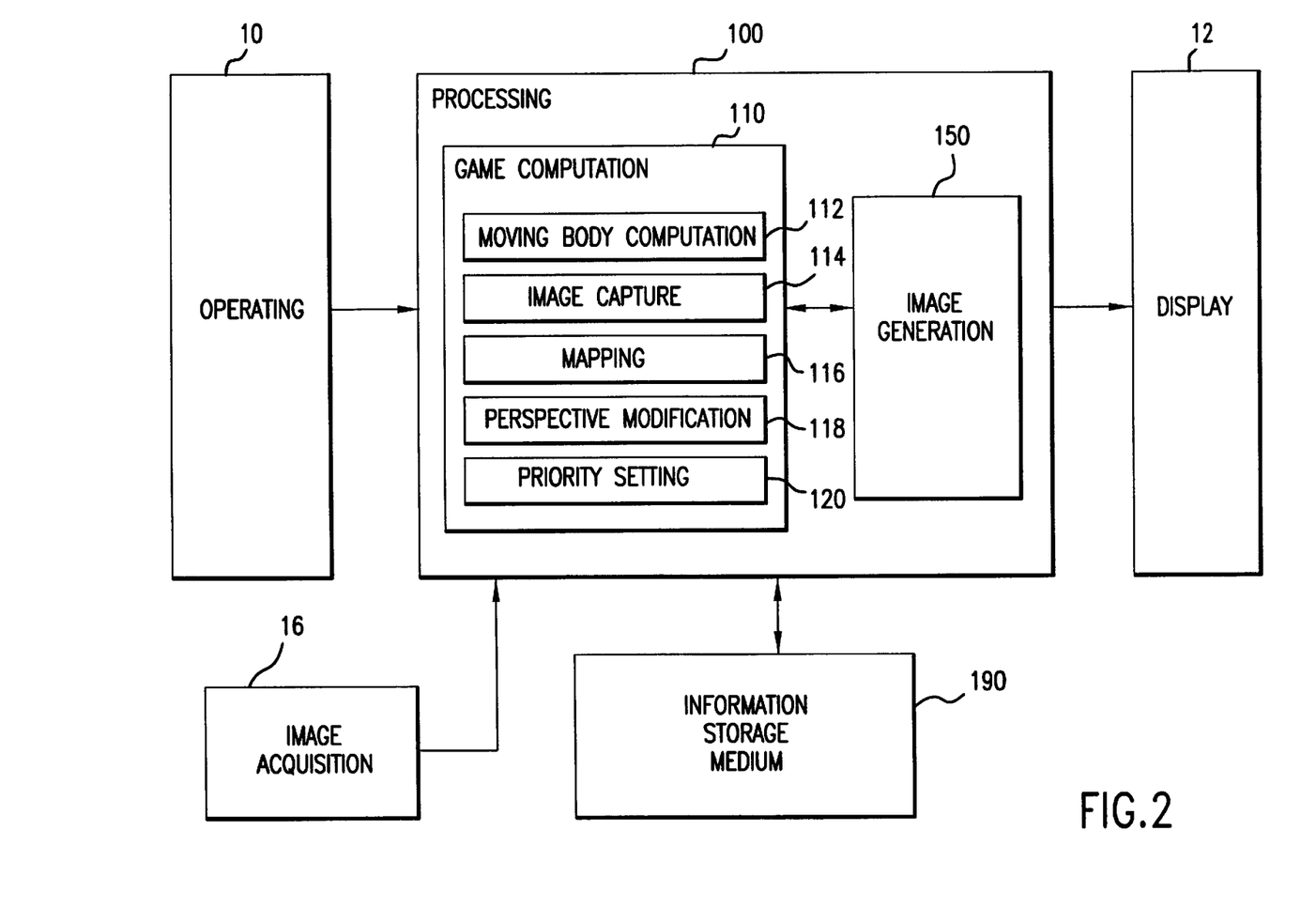
FIG. 2 is a functional block diagram of the image generation device of the present embodiment.

A typical function block diagram of an image generation device of the present embodiment is shown in FIG. 2.

In this case, an operating section 10 inputs manipulation data through the operation of the machine gun of FIG. 1, or the like, by the player and manipulation data that has been obtained by the operating section 10 is input to a processing section 100.

The processing section 100 performs processing such as that for disposing objects within the object space and for generating an image as seen from a given viewpoint in the object space, based on information such as the above described manipulation data and a given program. The functions of the processing section 100 could be implemented by hardware such as a CPU (either CISC or RISC), a DSP, an ASIC (such as a gate array), or memory.

An information storage medium 190 stores programs and data. The functions of this information storage medium 190 could be implemented by hardware such as a CD-ROM, game cassette, IC card, magneto-optical disk, floppy disk, digital video disk, hard disk, or memory. The processing section 100 performs the various kinds of processing thereof based on programs and data from this information storage medium 190.

The processing section 100 comprises a game computation section 110 and an image generation section 150.

In this case, the game computation section 110 performs the various processings, such as setting the game mode, moving the game forward, determining the position and direction of the moving body, determining the viewpoint position and line-of-sight direction, and disposing objects within the object space.

The image generation section 150 creates an image at a given viewpoint, in the object space as set by the game computation section 110. The image produced by the image generation section 150 is displayed on a display section 12.

The game computation section 110 comprises a moving body computation section 112, an image capture section 114, a mapping section 116, a perspective modification section 118, and a priority setting section 120.

In this case, the moving body computation section 112 moves a moving body of which action is controlled by a given control program (computer) and a moving body (character) which is manipulated by the player, within the object space, based on a given program and manipulation data that is input from the operating section 10. More specifically, it performs calculations to obtain the position and direction of the moving body in every frame (every 1/60 second).

Assume, for example, that the position of the moving body in a (k−1)th frame is PMk−1, its velocity is VMk−1, its acceleration is AMk−1, and the time taken for one frame is Δt. Thus the position PMk and velocity VMk of the moving body in the kth frame are obtained from the following equations:

$$PMk=PMk-1+VMk-1\times\Delta t \qquad (1)$$

$$VMk=VMk-1+AMk-1\times\Delta t \qquad (2)$$

The image capture section 114 captures images that have been acquired by the image acquisition sections 16. More specifically, it writes the captured image into a texture memory, configured of RAM or the like. In such a case, identification images for the other players can be written into the texture memory, not only the identification image of the self player.

The mapping section 116 performs processing to map the captured player identification image onto an object. More specifically, the present embodiment provides a marker object for a character (moving body), which follows the character as it moves around the object space. The captured player identification images are mapped onto the marker objects of the corresponding characters. For example, an identification image of the self player (an image acquired of the player at that terminal) is mapped onto a marker object for the character that is manipulated by that player, similarly, identification images of other players (images acquired of those players) are mapped onto the marker objects for the characters that are manipulated by those players.

The perspective modification section 118 performs processing to modify the perspective of the captured player identification images, depending on whether the marker objects on which these player identification images are mapped are nearer or farther away. More specifically, it modifies the perspective of each player identification image in accordance with the distance between the player's viewpoint position and the marker object (or character). This ensures that the player can recognize each player identification image easily and distinctly, no matter how far away a marker object is from the player's viewpoint.

The priority setting section 120 performs processing to set a priority for hidden-surface removal. In the present embodiment, the priorities of a marker object is set to be higher that the priority of another, obscuring object. This ensures that the player can recognize the player identification images, even when the corresponding marker objects are positioned on the further side of obscuring objects.

Figure 3A:
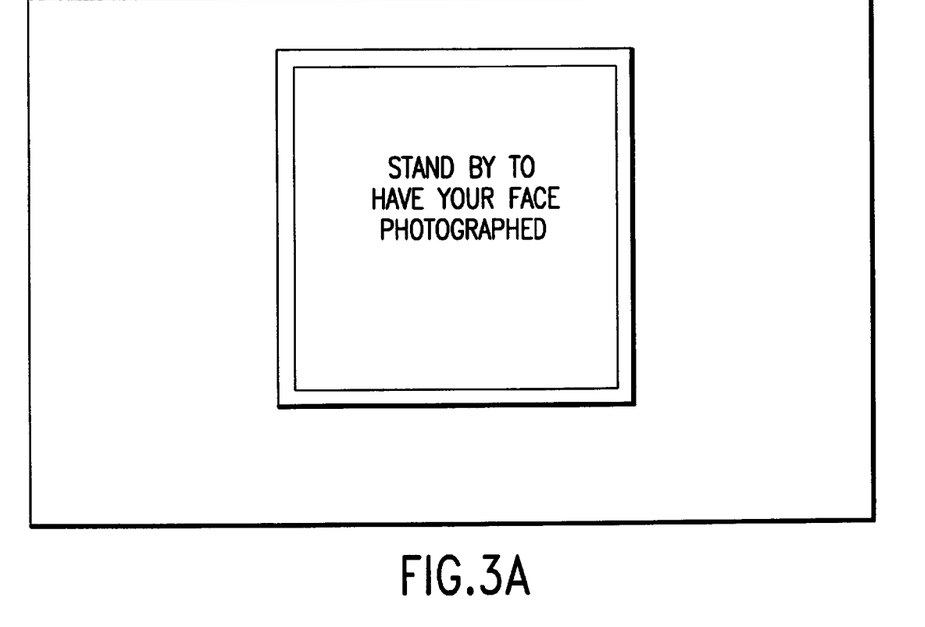
FIGS. 3A and 3B show examples of images generated by the present embodiment.
Figure 3B:
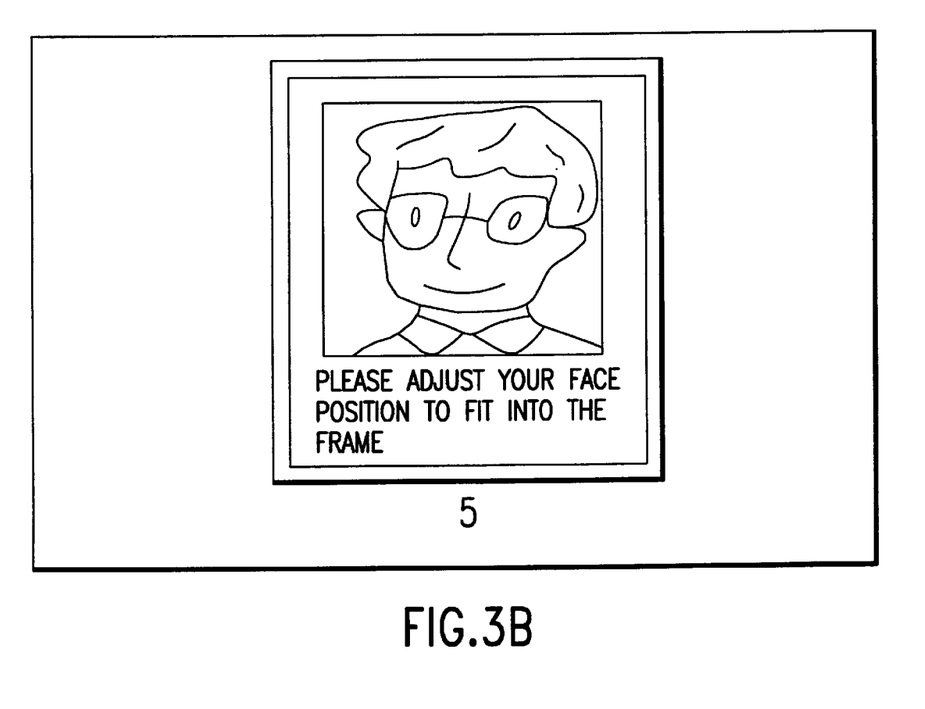

Examples of images that are displayed on the display section 12 during the acquiring of a player identification image are shown in FIGS. 3A and 3B. First of all, a display appears to inform the player that his or her face is going to be photographed, as shown in FIG. 3A. Then the player can move his or her face around on the screen so that it fits into the frame, as shown in FIG. 3B. The image is acquired after a given time has elapsed. Thus face images of all the players participating in the game are acquired as player identification images.

Figure 4A:
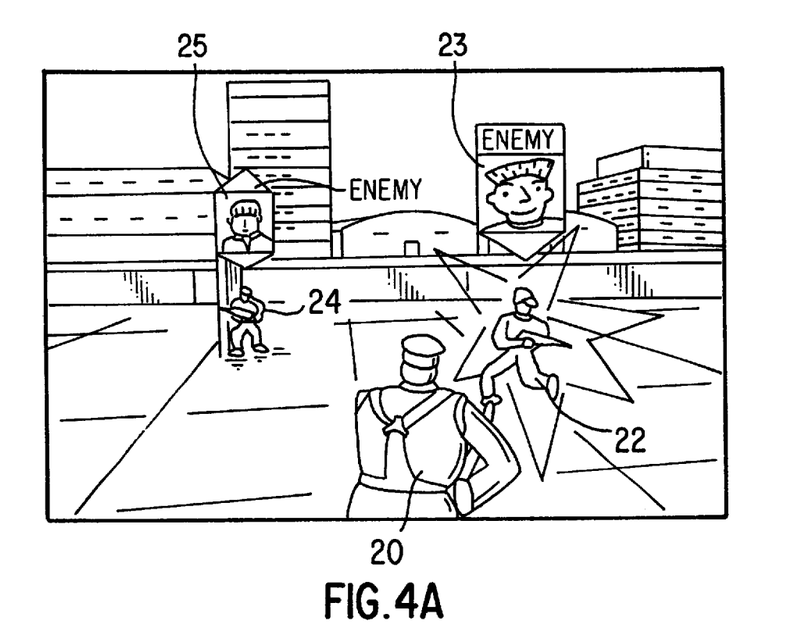
FIGS. 4A and 4B show further examples of images generated by the present embodiment.

Examples of images that are generated by the present embodiment during the game are shown in FIGS. 4A, 4B, 5A, and 5B. In FIG. 4A, the player manipulates a self character 20 (a soldier) by moving the corresponding machine gun of FIG. 1 from side to side and backward and forward. The player pulls the trigger of the machine gun to shoot at an enemy character 22 in FIG. 4A. An identification image of the player manipulating the enemy character 22 is mapped onto a marker object 23 of the enemy character 22. An identification image of the player manipulating another enemy character 24 is similarly mapped onto a maker object 25 of that enemy character 24. This mapping of player identification images onto the marker objects ensures that each player can recognize at a glance which of the other players is manipulating which character. This enables each player to gain a feeling of battling against those other players in real life, making it possible to heighten the experience of a virtual reality.

Figure 4B:
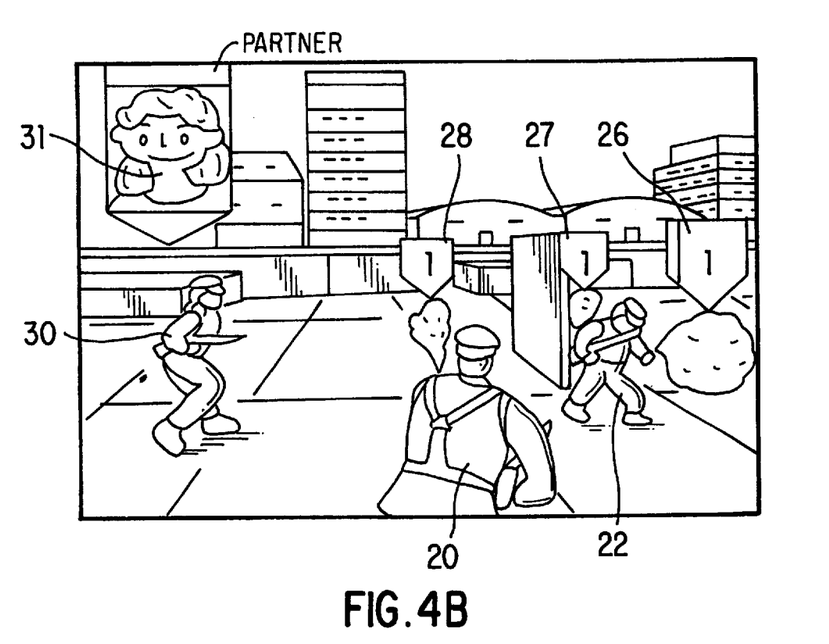

If the enemy character 22 is defeated, medals 26, 27, and 28 held by that enemy character 22 are released, as shown in FIG. 4B. The player can pick up these released medals 26, 27, and 28 by manipulating the self character 20 to come into contact with them. In this game, the game result is determined by the total number of medals that is ultimately held. Therefore, a vital strategy is to defeat an enemy character holding a lot of these medals, and take them.

Note that the configuration of the game is such that the enemy character 22 can be revived in a given time after it falls, to re-enter the game. The released medals 26, 27, and 28 can also be picked up by another character such as a partner character 30. A marker object 31 on which a player identification image is mapped also follows the partner character 30, so that the player can easily recognize that this character is a partner.

Figure 5A:
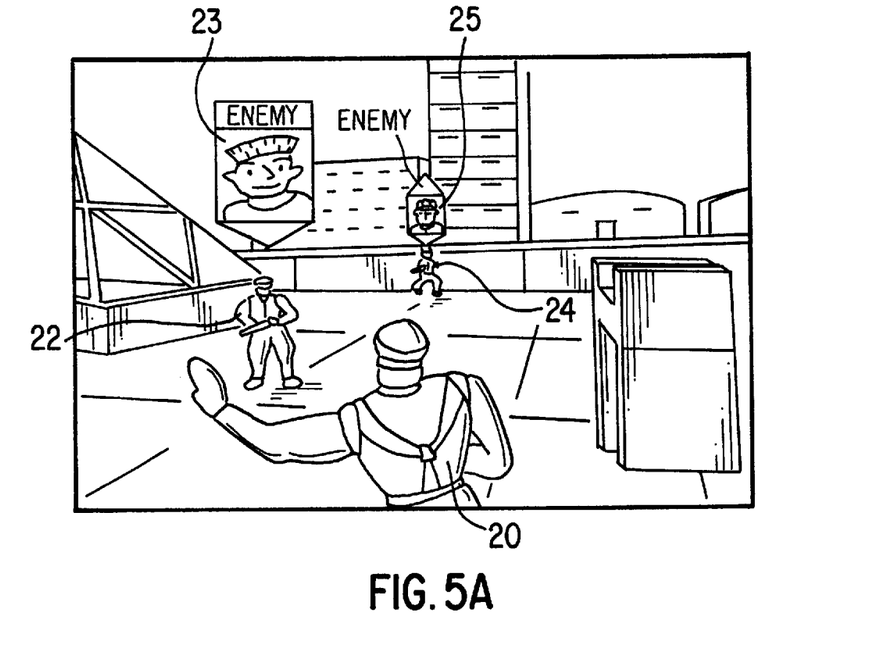
FIGS. 5A and 5B show more examples of images generated by the present embodiment.

In FIG. 5A, the marker object 23 of the enemy character 22 is near but the marker object 25 of the enemy character 24 is far away. When the marker object 25 is far away, a problem arises in that it is difficult for the player to recognize the player identification image that is mapped thereon. In other words, since the marker object 25 is moving within the object space, the perspective thereof is determined by the distance between the player's viewpoint position and the marker object 25. When the marker object 25 is far away, the marker object 25 appears to be extremely small on the screen as seen by the player. If a player identification image becomes too small on the screen, the player will no longer be able to recognize which of the other players is manipulating the enemy character 24. As a result, the player identification image will no longer function as an image for identifying the other player, and so will become meaningless.

In the present embodiment, this problem is solved by modifying the perspective of each player identification image, depending on whether the marker object bearing the player identification image is near or far away. More specifically, when the marker object is far away, the perspective is modified so that it appears to be nearer than its actual position. Alternatively, when the marker object is near, the perspective could also be modified so that it appears to be further away. This makes it possible for the player identification images to fully demonstrate their original function.

Figure 5B:
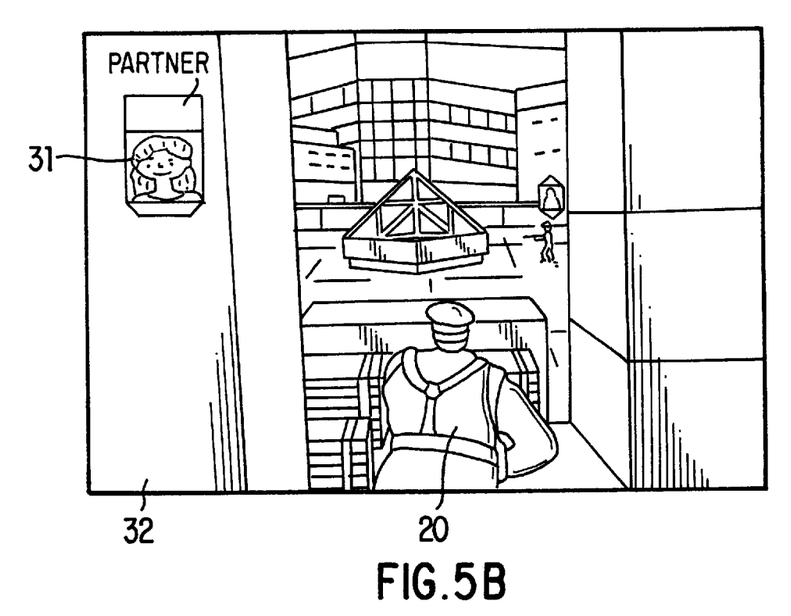

In addition, when the marker object 31 bearing the player identification image is behind an obscuring object 32 (other object), an image of the marker object 31 is created to appear in front of the obscuring object 32. In other words, the marker object 31 is seen through the obscuring object 32. This makes it possible for the player to always comprehend the positions of the other characters, even when the game is played on a complicated map with many obscuring objects. As a result, it is possible to solve the problem of the difficulty of operation, which is one reason why three-dimensional games of this type are shunned by beginners.

The description now turns to specific examples of the processing used for modifying the perspective (the perspective method).

Figures 6A, 6C:
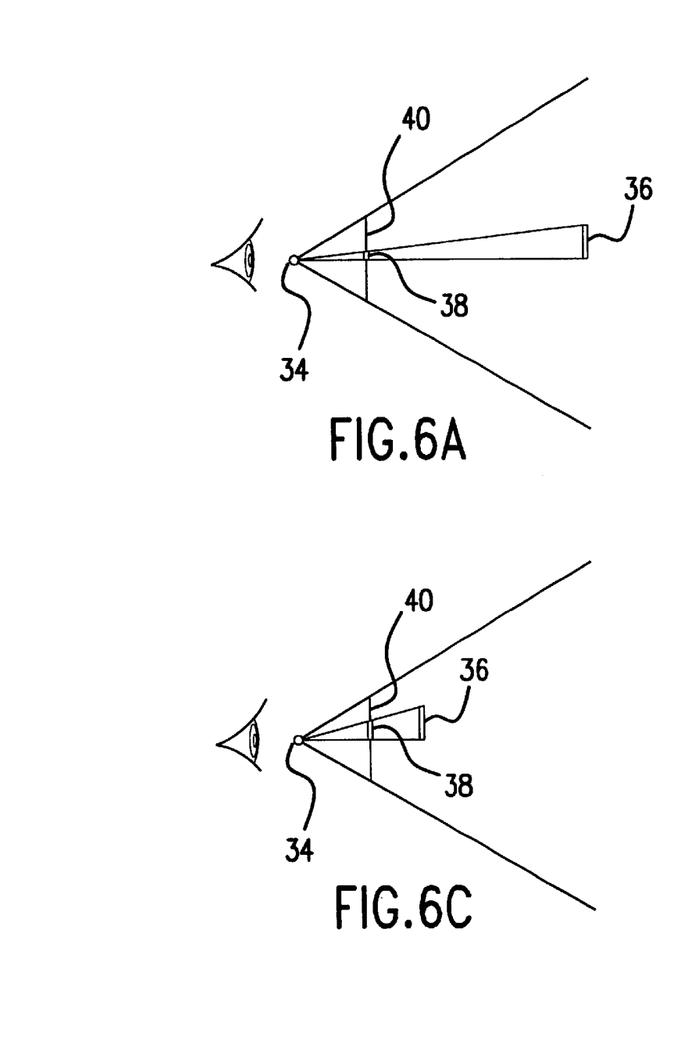
FIGS. 6A, 6B, 6C, and 6D are illustrative of specific examples of the processing used to modify the perspective.

Consider a case in which a marker object 36 is far from the viewpoint position 34 of the player, as shown by way of example in FIG. 6A. In this case, a projected image 38 of the marker object 36 that is perspectively projected through a screen (projection surface) 40 is extremely small. It is therefore difficult for the player to recognize details of a player identification image that is mapped onto the marker object 36.

Figure 6B:
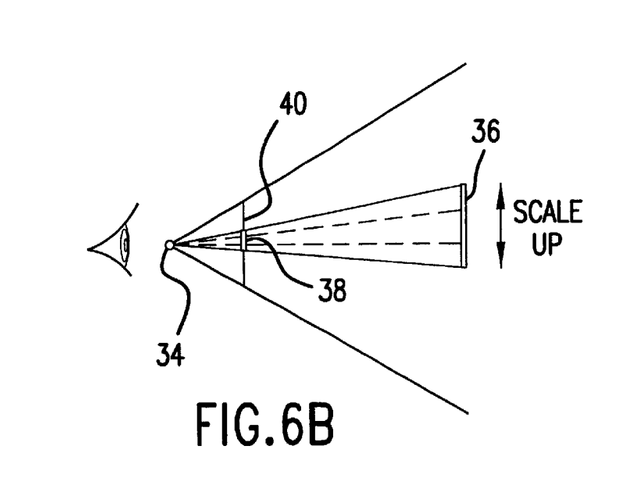

With the present embodiment of the invention, the perspective is modified to make the marker object 36 appear to be nearer than its actual position, when it is far from the viewpoint position 34. More specifically, the marker object 36 is scaled up (the scaling factor thereof is increased), as shown in FIG. 6B. This makes the projected image 38 somewhat bigger, so that the player can recognize details of the player identification image.

Consider another case in which the marker object 36 is close to the viewpoint position 34 of the player, as shown in FIG. 6C. In this case, the projected image 38 is extremely big. The player identification image is therefore displayed unnecessarily large, which imparts an unnatural impression to the player and can cause the player to fall to recognize the other images.

Figure 6D:
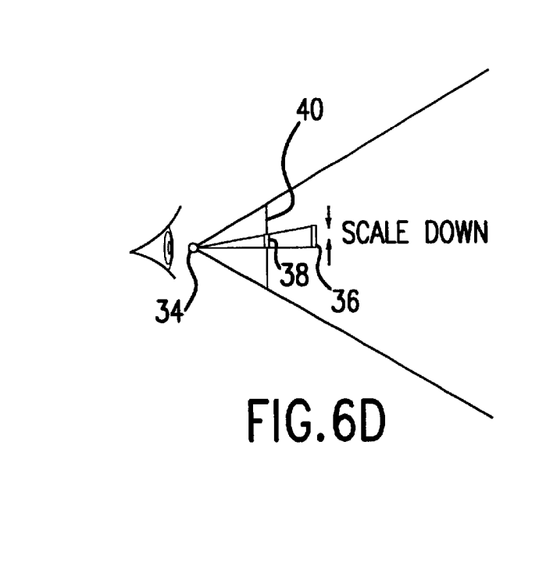

In case that the marker object 36 is too close to the marker object 36 in this manner, the perspective could be modified so that it appears to be further away than its actual position. More specifically, the marker object 36 is scaled down (the scaling factor thereof is reduced), as shown in FIG. 6D. This makes the projected image 38 smaller, so that the unnatural impression experienced by the player can be reduced.

Figure 7:
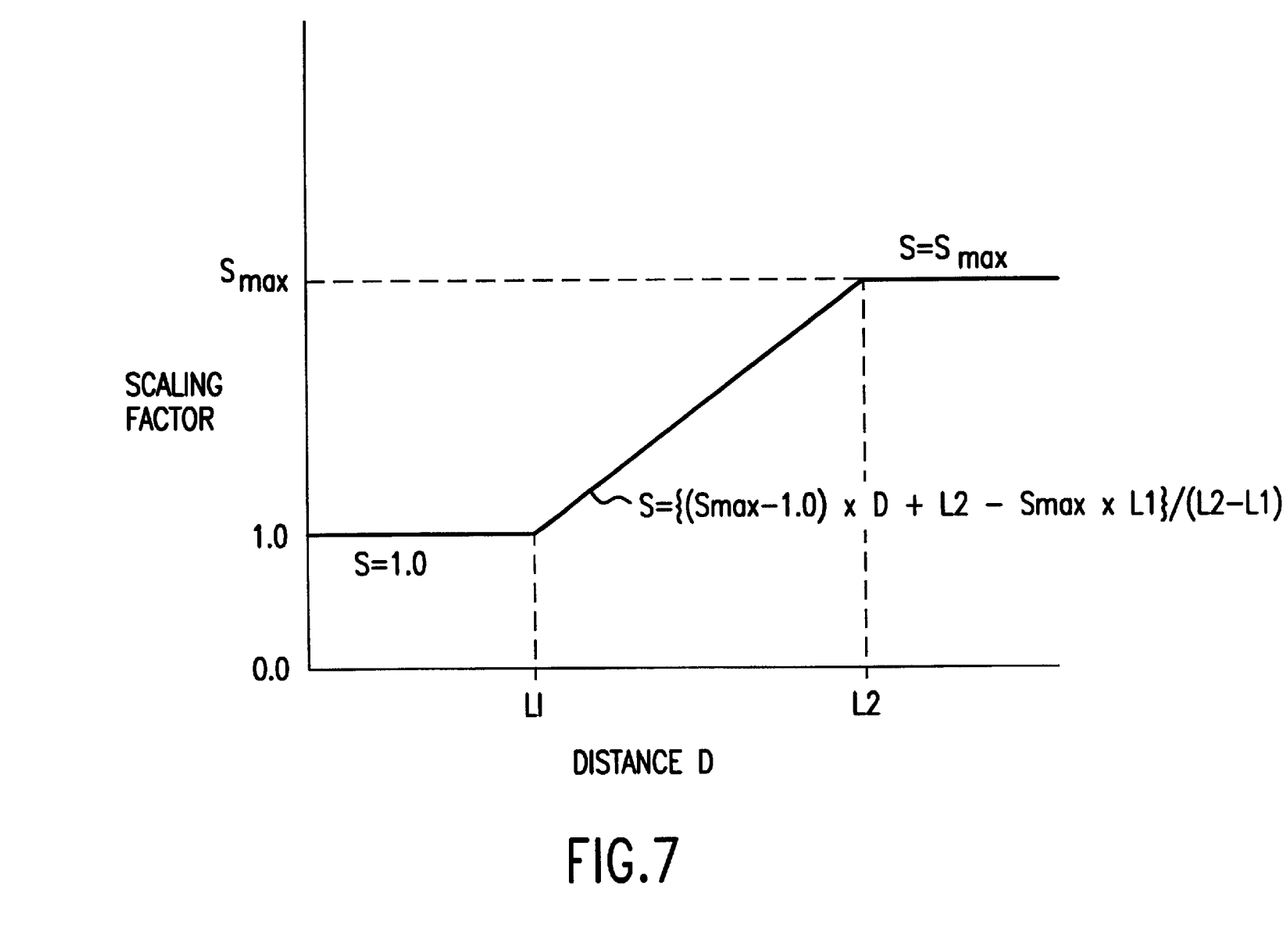
FIG. 7 is illustrative of a method of setting the scaling factor S.

An example of the method used for setting the scaling factor S is shown in FIG. 7. If the distance D between the viewpoint position and the marker object is such that $0 \leq D < L1$, the scaling factor S is set to 1.0. In other words, the marker object is not scaled up in this case.

However, when the distance D between the viewpoint position and the marker object is such that $L1 \leq D \leq L2$, the scaling factor S is set to $\{(Smax-1.0) \times D + L2 - Smax \times L1\}/(L2-L1)$. In other words, the scaling factor S increases as the distance D increases. Note that Smax is the maximum value of the scaling factor S that can be set in this case.

If the distance D between the viewpoint position and the marker object is such that $L2 < D$, the scaling factor S is set to Smax. In other words, the scaling factor S is fixed at the maximum value Smax, which is the value when $D = L2$, because. when the scaling factor S were to increase without limits as the distance D increases, there is a problem that an unnatural impression will be imparted to the player.

The description now turns to the method used to make a marker object visible when an obscuring object is in the way. Consider a case in which a character 54 and a marker object 56 thereof are on the other side of an obscuring object 52, as seen from a viewpoint position 50 of the player, as shown by way of example in FIG. 8A. When hidden-surface removal is performed in this case, the character 54 and the marker object 56 will be hidden by the obscuring object 52 and will thus not be visible.

Figure 8A:
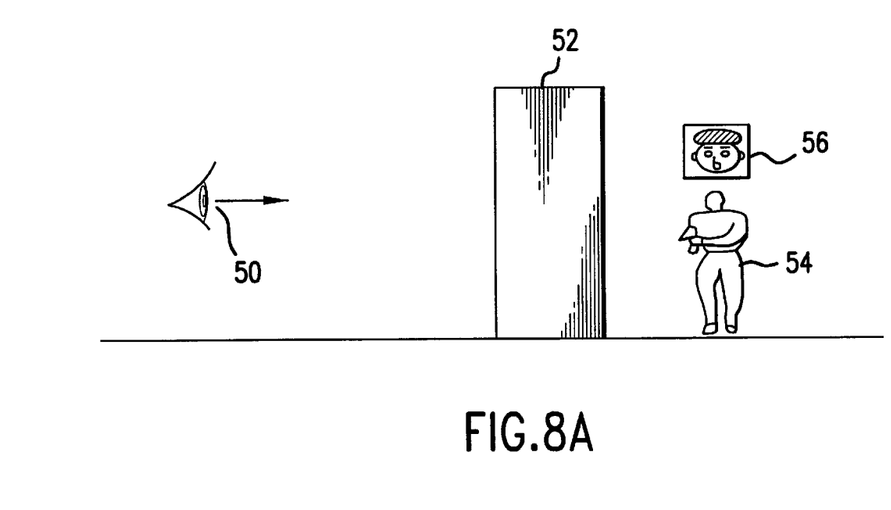
FIGS. 8A and 8B are illustrative of a method used to make a marker object to be seen through an obscuring object.

However, if this were to happen when there are many obscuring objects, the player would be totally unable to determine the positions of the opponents. Thus, self character lose its way within the object space, resulting the player's immersion in the game is extremely spoiled.

Figure 8B:
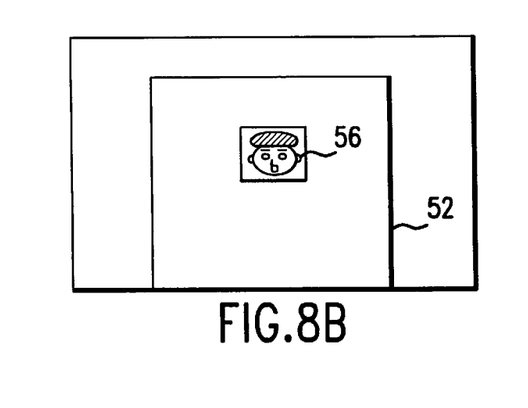

With the present embodiment of the invention, when the marker object 56 is behind the obscuring object 52, an image of the marker object 56 is generated to appear as if it is in front of the obscuring object 52, as shown in FIG. 8B. In this case, the present embodiment makes the marker object 56 appear as if the front of the obscuring object 52 by increasing the priority assigned to the marker object 56 for hidden-surface removal. In other words, if ordinary hidden-surface removal were performed, the obscuring object 52 would have a higher priority than the marker object 56 (because the depthwise distance thereof is smaller), so that the marker object 56 would not be displayed on the screen. When the priority for hidden-surface removal of the marker object 56 is set to be greater than that of the obscuring object 52 in this case, the marker object 56 can be made to appear on the screen as shown in FIG. 8B. This ensures that each player can easily recognize the positions of opponents, enabling the player to become immersed in the game world.

Note that techniques for increasing priorities for hidden-surface removal are already known, as disclosed in World Patent No. 95/09405, by way of example.

Figure 9:
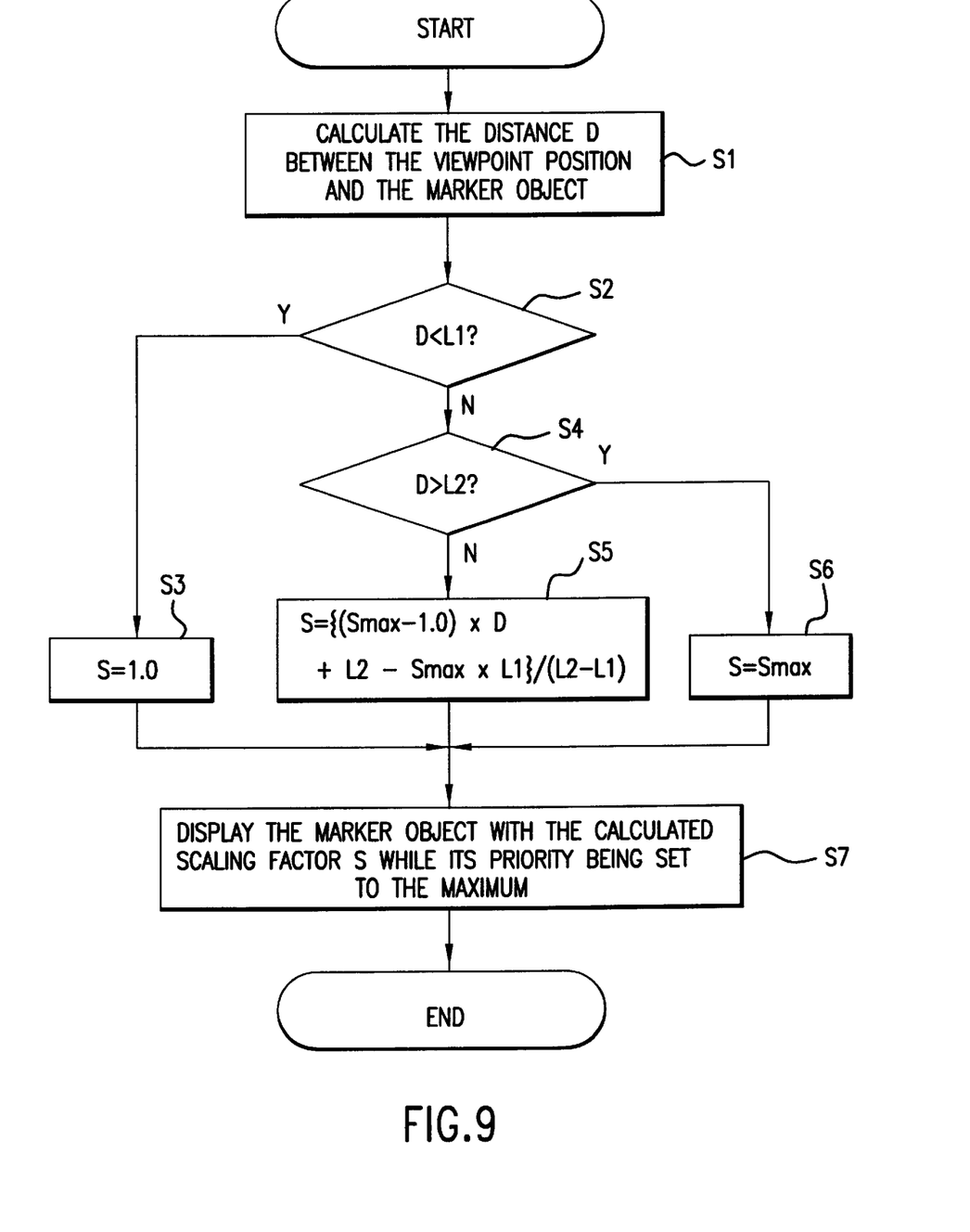
FIG. 9 is a flowchart illustrating details of the processing of the present embodiment.

A detailed example of the processing of the present embodiment will now be described with reference to the flowchart of FIG. 9.

First of all, the distance D between the viewpoint position and the marker object is calculated (step S1). In this case, the distance D could be straight line distance or depth distance. Alternatively, another distance such as that between the viewpoint position and another character or that between the self character and another character could be used instead of the distance between the viewpoint position and the marker object.

A decision is made as to whether or not the distance D is shorter than L1 (step S2). When it is shorter, the scaling factor S is set to 1.0 (step S3).

A decision is then made as to whether or not the distance D is longer than L2 (step S4). When it is shorter, the scaling factor S is set to $\{(Smax-1.0) \times D + L2 - Smax \times L1\}/(L2-L1)$ (step S5). When, on other other hand, it is longer, the scaling factor S is set to Smax (step S6).

Finally, the marker object is displayed with the calculated scaling factor S while its priority being set to the maximum (step S7).

With the above processing, the player identification function is not lost even when the objects is far away, and the marker object can be displayed to identify that position even if an obscuring object is in the way.

Figure 10:
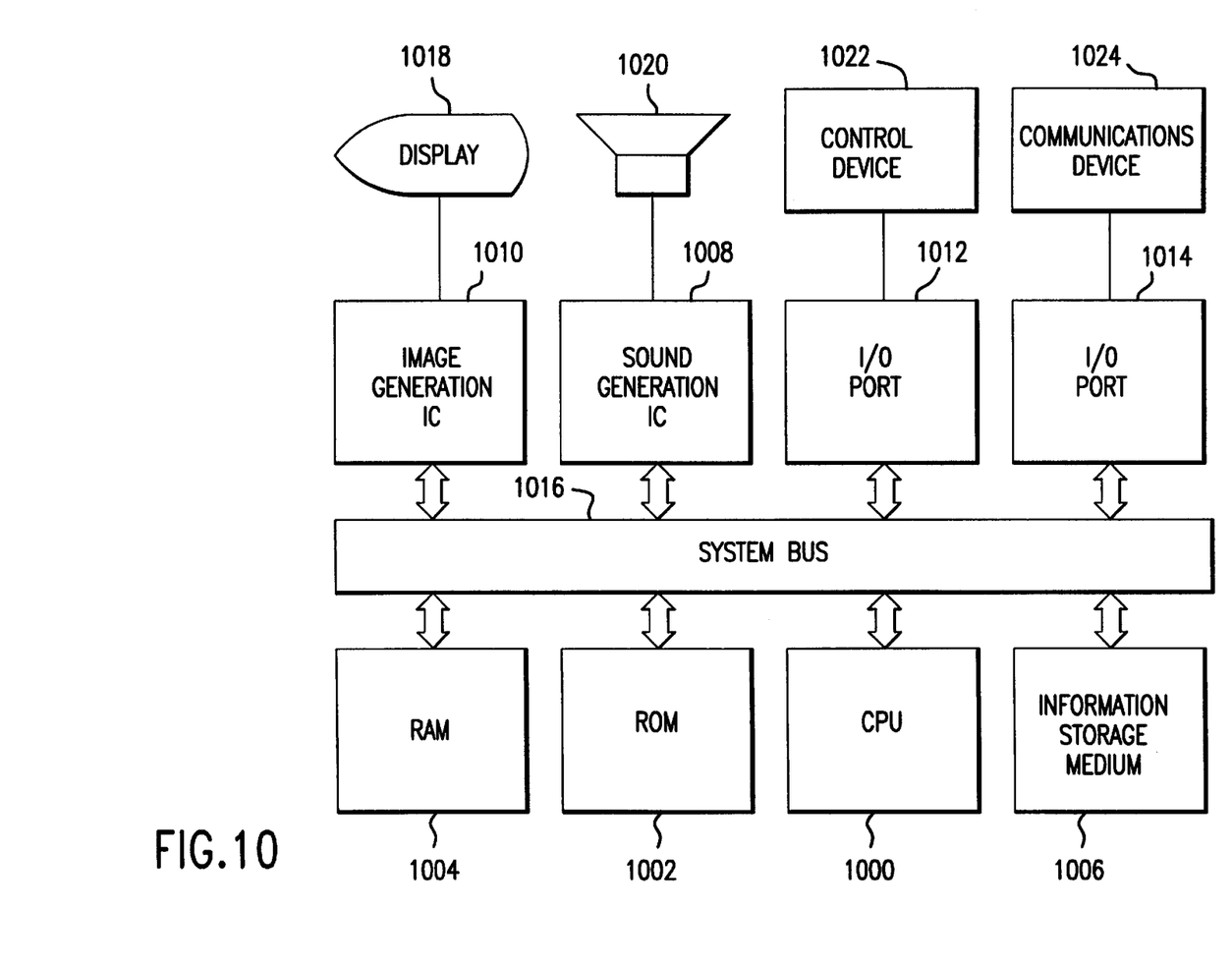
FIG. 10 shows an example of the configuration of hardware that can implement the present embodiment of the invention.

The description now turns to an example of the configuration of hardware that can implement the present embodiment of the invention, with reference to FIG. 10. In the apparatus shown in this figure, a CPU 1000, ROM 1002, RAM 1004, an information storage medium 1006, a sound generation IC 1008, an image generation IC 1010, and I/O ports 1012 and 1014 are connected together by a system bus 1016 so that data can be mutually transferred therebetween. A display 1018 is connected to the image generation IC 1010, a speaker 1020 is connected to the sound generation IC 1008, a control device 1022 is connected to the I/O port 1012, and a communications device 1024 is connected to the I/O port 1014.

Information storage medium 1006 mainly stores a program and data for representing display objects such as image data and sound data. Means such as a CD-ROM, game cassette, or DVD could be used as an information storage medium for storing a game program for a domestic game machine. Alternatively, memory such as ROM could be used for an arcade game machine, in which case the information storage medium 1006 is the ROM 1002.

The control device 1022 is equivalent to a game controller or operating panel and it is used as a device for inputting into the main unit of the device the results of decisions made by the player as the game progresses.

The CPU 1000 controls the entire device and processes data in accordance with a program stored in the information storage medium 1006, a system program stored in the ROM 1002 (including initialization information for the entire apparatus), and signals input through the control device 1022. The ram 1004 is a storage means that is used as a work space for the CPU 1000, and given contents of the information storage medium 1006 or the ROM 1002, or the results of calculations by the CPU 1000, are stored therein. A data configuration having a logical structure for implementing the present embodiment is constructed within this RAM or information storage medium.

The provision of the sound generation IC 1008 and the image generation IC 1010 in this type of device makes it possible to output game sounds and game images as required. The sound generation IC 1008 is an integrated circuit device that synthesizes game sounds such as sound effects and background music, based on information stored in the information storage medium 1006 or the ROM 1002, and the thus synthesized game sounds are output by the speaker 1020. The image generation IC 1010 is an integrated circuit device that synthesizes pixel information for outputting to the display 1018, based on image information that is sent from components such as the RAM 1004, the ROM 1002, and the information storage medium 1006. Note that a device called a head-mounted display (HMD) could also be used as the display 1018.

The communications device 1024 transfer various types of information used within the game machine to and from external devices, and it is used to send and receive given information in accordance with a game program when connected to another game machine, or to send and receive information such as a game program through a communications line.

The processing described with reference to FIGS. 1 to 8 is implemented by components such as the information storage medium 1006 that stores a program for performing processing shown in the flowchart of FIG. 9, the CPU 1000 that operates in accordance with that program, and the image generation IC 1010 and sound generation IC 1008. Note that the processing performed by the image generation IC 1010 and the sound generation IC 1008 could be performed in a software manner by means such as the CPU 1000 or an ordinary DSP.

An example of the present embodiment applied to an arcade game machine is shown in FIG. 1, as described previously. In this case, components such as a CPU, an image generation IC, and a sound generation IC are mounted on a system board 1106 built into the device. A memory 118 is the information storage medium on the system board 1106 and stores information such as: information for capturing an image that has been acquired by an image acquisition means; information for mapping a captured image onto an object; information for modifying the perspective of this captured image, depending on whether the object on which the captured image is mapped is near or far away; information for generating an image at a given viewpoint within the object space; and information for generating an image of this object that appears to be nearer than another object, when the object on which the captured image is mapped is behind the other object. This information is hereinafter called stored information. This stored information comprises at least one type of information, such as program coding for performing the above described processing, image information, sound information, shapes information for display objects, table data, list data, or player information.

Figure 11A:
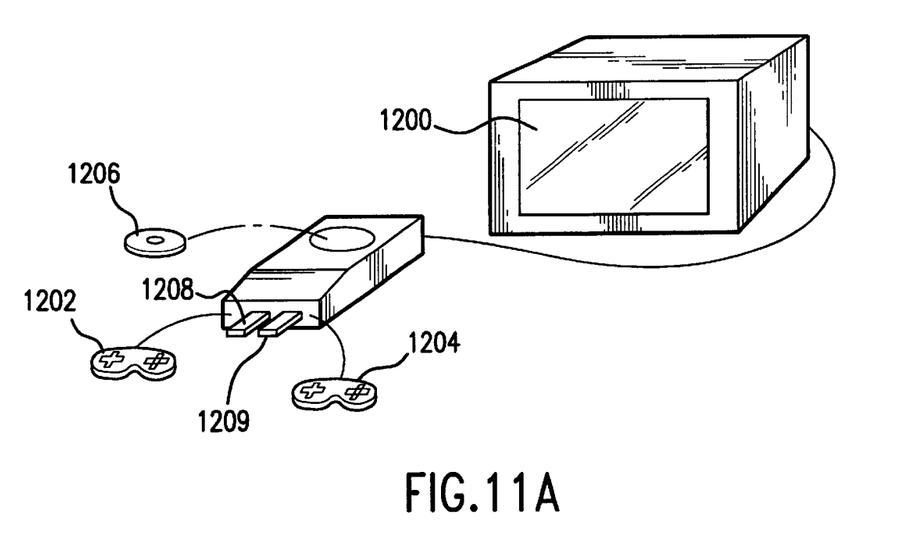
FIGS. 11A and 11B show examples of devices to which the present embodiment of the invention is applied.

An example of the present embodiment applied to a domestic game machine is shown in FIG. 11A. Players enjoy the game by manipulating game controllers 1202 and 1204 while viewing a game image shown on a display 1200. In this case, the above described stored information is stored in information storage media that can be freely inserted into and removed from the main unit, such as a CD-ROM 1206 or IC cards 1208 and 1209.

Figure 11B:
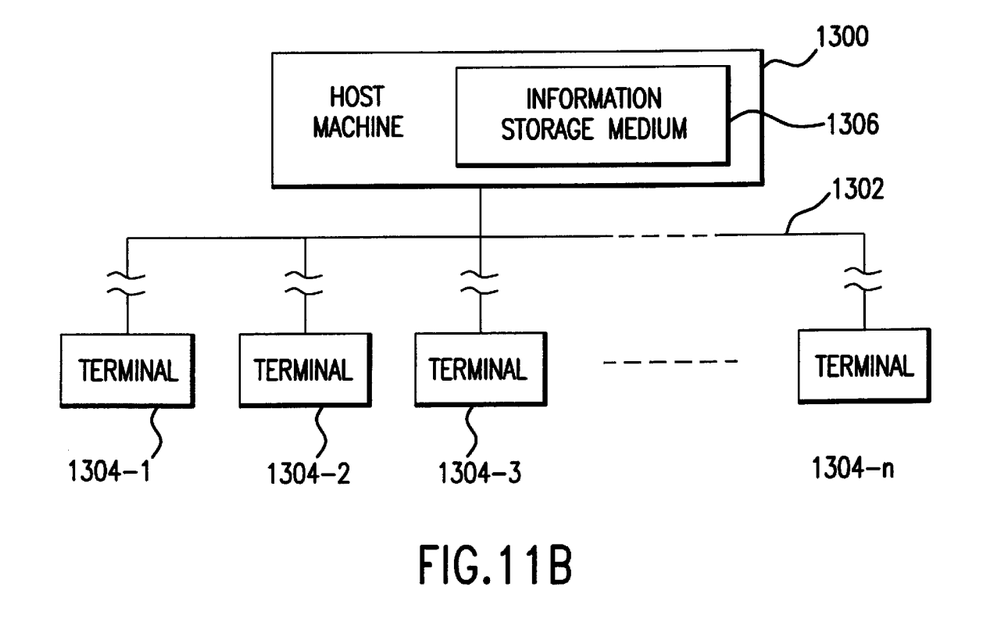

An example of the present embodiment applied to a game machine is shown in FIG. 11B where the game machine comprises a host machine 1300 and terminals 1304-1 to 1304-n connected to the host machine 1300 by a communications line 1302. In this case, the above described stored information is stored in an information storage medium 1306 such as a magnetic disk device, magnetic tape device, or memory that can be controlled by the host machine 1300. In case that each of the terminals 1304-1 to 1304-n has a CPU, an image generation IC, and a sound generation IC to generate game images and sounds in a stand-alone manner, a game program for generating game images and sounds is transferred to the terminals 1304-1 to 1304-n from the host machine 1300. On the other hand, in case that they cannot be generated in a stand-alone manner, the host machine 1300 creates the game images and sounds then transfers them to the terminals 1304-1 to 1304-n for outputting by those terminals.

Note that the present invention is not limited to the above described embodiments and it can be implemented in various other ways.

For example, the above embodiment was described as using a captured image as a player identification image, but the present invention is not limited thereto and it thus covers the use of a captured image in applications other than a player identification image.

Furthermore, the scaling factor was varied in the present embodiment in order to modify the perspective. It is preferable to vary the scaling factor, from the viewpoint of simplifying the processing, but the perspective modification method of the present invention is not limited thereto and thus various other means can be conceived therefor.

The method of allowing an object on which the captured image is mapped to be seen through another object is similarly not limited to that described for the present embodiment.

In the present embodiment, the captured image was described as being mapped onto the marker object, but the present invention is not limited thereto and the captured image could equally well be mapped onto the character (moving body) itself, by way of example.

Similarly, the invention is not limited to a single image acquisition before the game starts; images could equally well be acquired in real time during the game, and the thus-acquired images can also be mapped onto the objects.

In addition, the present embodiment was described as an application of the present invention to a multi-player game, but the present invention is not limited thereto and thus it can equally well be applied to a single-player game.

Similarly, the present embodiment was described as an application of the present invention to a machine-gun game, but the present invention is not limited thereto and thus it can also be applied to various other games (such as competitive games, sports games, combat games, role-playing games, or shooting games).

The present invention is also not limited to domestic and arcade game machines; it can be applied to various other image generation devices such as simulators, large-scale attractions in which many players can participate, personal computers, multimedia terminals, and system boards that create game images.

What is claimed is:

1. An image generation device for generating an image at a given viewpoint within an object space, comprising:
   means for capturing an image acquired by an image acquisition means;
   means for mapping a captured image onto an object;
   means for modifying the perspective of the captured image, in accordance with whether the object on which the captured image is mapped is far or near; and
   means for generating an image at a given viewpoint within an object space,
   wherein said perspective is modified in such a manner that, when said object on which said captured image is mapped is far away, said object is made to appear to be nearer than the actual position thereof.

2. The image generation device as defined in claim 1, wherein said perspective is modified in such a manner that, when said object on which said captured image is mapped is near, said object is made to appear to be farther away than the actual position thereof.

3. The image generation device as defined in claim 2, wherein said perspective is modified in such a manner that, when said object on which said captured image is mapped is near, said object is made to appear to be farther away than the actual position thereof.

4. The image generation device as defined in claim 2, wherein said perspective is modified by varying a scaling factor of said object on which said captured image is mapped.

5. The image generation device as defined in claim 2, wherein when said object on which said captured image is mapped is behind another object, an image of said object is generated as if appearing in front of said other object. object on which said captured image is mapped is near, said object is made to appear to be farther away then the actual position thereof.

6. The image generation device as defined in claim 5, wherein an image of said object is generated as if appearing in front of said other object, by increasing a priority assigned for hidden-surface removal to said object on which said captured image is mapped.

7. The image generation device as defined in claim 2, wherein:
said object on which said captured image is mapped is any one of a moving body that is moving within an object space and an object that follows said moving body; and
said captured image is an identification image for identifying a player who is manipulating said moving body.

8. The image generation device as defined in claim 1, wherein said perspective is modified by varying a scaling factor of said object on which said captured image is mapped.

9. The image generation device as defined in claim 1, wherein when said object on which said captured image is mapped is behind another object, an image of said object is generated as if appearing in front of said other object.

10. The image generation device as defined in claim 9, wherein an image of said object is generated as if appearing in front of said other object, by increasing a priority assigned for hidden-surface removal to said object on which said captured image is mapped.

11. The image generation device as defined in claim 1, wherein:
said object on which said captured image is mapped is any one of a moving body that is moving within an object space and an object that follows said moving body; and
said captured image is an identification image for identifying a player who is manipulating said moving body.

12. An information storage medium capable of allowing a computer to read information therefrom, for generating an image at a given viewpoint within an object space, said information storage medium comprising:
information for capturing an image acquired by an image acquisition means;
information for mapping a captured image onto an object;
information for modifying the perspective of said captured image, in accordance with whether said object on which said captured image is mapped is far or near; and
information for generating an image at a given viewpoint within an object space,
wherein said perspective is modified in such a manner that, when said object on which said captured image is mapped is far away, said object is made to appear to be nearer than the actual position thereof.

13. The information storage medium as defined in claim 12, wherein said perspective is modified in such a manner that, when said object on which said captured image is mapped is near, said object is made to appear to be farther away than the actual position thereof.

14. The information storage medium as defined in claim 13, wherein said perspective is modified in such a manner that, when said object on which said captured image is mapped is near, said object is made to appear to be farther away than the actual position thereof.

15. The information storage medium as defined in claim 13, wherein said perspective is modified by varying a scaling factor of said object on which said captured image is mapped.

16. The information storage medium as defined in claim 13, wherein, when said object on which said captured image is mapped is behind another object, an image of said object is generated as if appearing in front of said other object.

17. The information storage medium as defined in claim 16, wherein an image of said object is generated as if appearing in front of said other object, by increasing a priority assigned for hidden-surface removal to said object on which said captured image is mapped.

18. The information storage medium as defined in claim 13, wherein:
said object on which said captured image is mapped is any one of a moving body that is moving within an object space and an object that follows said moving; and
said captured image is an identification image for identifying a player who is manipulating said moving body.

19. The information storage medium as defined in claim 12, wherein said perspective is modified by varying a scaling factor of said object on which said captured image is mapped.

20. The information storage medium as defined in claim 12, wherein, when said object on which said captured image is mapped is behind another object, an image of said object is generated as if appearing in front of said other object.

21. The information storage medium as defined in claim 20, wherein an image of said object is generated as if appearing in front of said other object, by increasing a priority assigned for hidden-surface removal to said object on which said captured image is mapped.

22. The information storage medium as defined in claim 12, wherein:
said object on which said captured image is mapped is any one of a moving body that is moving within an object space and an object that follows said moving body; and
said captured image is an identification image for identifying a player who is manipulating said moving body.

23. An image generation method for generating an image at a given viewpoint within an object space, comprising:
capturing an image acquired by an image acquisition device;
mapping a captured image onto an object;
modifying the perspective of the captured image, in accordance with whether the object on which the captured image is mapped is far or near; and
generating an image at a given viewpoint within an object space,
wherein said perspective is modified in such a manner that, when said object on which said captured image is mapped is far away, said object is made to appear to be nearer than the actual position thereof.

24. The image generation method as defined in claim 23, wherein said perspective is modified by varying a scaling factor of said object on which said captured image is mapped.

25. The image generation method as defined in claim 23, wherein when said object on which said captured image is mapped is behind another object, an image of said object is generated as if appearing in front of said other object.

26. The image generation method as defined in claim 25, wherein an image of said object is generated as if appearing in front of said other object, by increasing a priority assigned for hidden-surface removal to said object on which said captured image is mapped.

27. The image generation method as defined in claim 23, wherein:

said object on which said captured image is mapped is any one of a moving body that is moving within an object space and an object that follows said moving body; and said captured image is an identification image for identifying a player who is manipulating said moving body.

28. An image generation method for generating an image at a given viewpoint within an object space, comprising:

capturing an image acquired by an image acquisition device;

mapping a captured image onto an object;

modifying the perspective of the captured image, in accordance with whether the object on which the captured image is mapped is far or near; and generating an image at a given viewpoint within an object space, wherein said perspective is modified in such a manner that, when said object on which said captured image is mapped is near, said object is made to appear to be farther away than the actual position thereof.

29. The image generation method as defined in claim 28, wherein said perspective is modified by varying a scaling factor of said object on which said captured image is mapped.

30. The image generation method as defined in claim 28, wherein when said object on which said captured image is mapped is behind another object, an image of said object is generated as if appearing in front of said other object.

31. The image generation method as defined in claim 30, wherein an image of said object is generated as if appearing in front of said other object, by increasing a priority assigned for hidden-surface removal to said object on which said captured image is mapped.

32. The image generation method as defined in claim 28, wherein:

said object on which said captured image is mapped is any one of a moving body that is moving within an object space and an object that follows said moving body; and said captured image is an identification image for identifying a player who is manipulating said moving body.

* * * * *